United States Patent [19]

Horn

[11] Patent Number: 5,447,783

[45] Date of Patent: Sep. 5, 1995

[54] VAPOR-PERMEABLE, WATER RESISTANT MULTICOMPONENT FILM STRUCTURE

[75] Inventor: Murray H. Horn, Wilmington, Del.

[73] Assignee: E. I. Du Pont de Nemours and Company, Wilmington, Del.

[21] Appl. No.: 379,379

[22] Filed: Jan. 26, 1995

[51] Int. Cl.[6] .................. B32B 7/02; B32B 27/08; B32B 27/36
[52] U.S. Cl. .................. 428/216; 428/262; 428/323; 428/473.5; 428/481; 428/475.5; 428/482; 428/913; 528/301; 528/343
[58] Field of Search .............. 428/481, 482, 216, 262, 428/323, 473.5, 475.5, 913; 528/301, 343

[56] References Cited

U.S. PATENT DOCUMENTS

| | | | |
|---|---|---|---|
| 4,725,481 | 2/1988 | Ostapchenko | 428/213 |
| 4,769,273 | 9/1988 | Hoeschele et al. | 428/215 |
| 5,171,309 | 12/1992 | Gallagher et al. | 428/480 |
| 5,173,357 | 12/1992 | Nakane et al. | 428/220 |

*Primary Examiner*—P. C. Sluby

[57] ABSTRACT

A multicomponent film structure having at least three layers the outer layers of which are each a continuous layer of a hydrophobic copolyetherester elastomer and an inner layer of which is a continuous layer of a hydrophilic copolyetherester elastomer, said film structure having good resistance to water absorption.

6 Claims, No Drawings

VAPOR-PERMEABLE, WATER RESISTANT MULTICOMPONENT FILM STRUCTURE

BACKGROUND OF THE INVENTION

Vapor-permeable, waterproof bicomponent film structures made from a hydrophobic copolyetherester elastomer film layer and a hydrophilic copolyetherester elastomer film layer are known in the art and are described in U.S. Pat. No. 4,725,481. Such film structures are often bonded to a textile material to result in a so-called "breathable, waterproof" fabric. It has been found that the hydrophilic layer of such film structure may exhibit very high moisture vapor transmission rates and as a result, it may absorb large quantities of water. This high water absorption can result in swelling of the film structure and stress at the bond between the textile material and the film structure. This stressing phenomena tends to increase with repeated laundering and drying of the film structure/textile material until delamination occurs.

It has been found in the present invention that a multilayer film structure having outer layers of a hydrophobic copolyetherester elastomer and at least one inner layer of a hydrophilic copolyetherester elastomer has better resistance to water absorption than a comparable two layer film structure. As such, the multicomponent multilayer film structure of the present invention has improved dimensional stability in an aqueous environment and as a result, adhesion retention of the present film structure, when bonded to a textile material, will be improved in comparison to that achieved through use of a comparable bicomponent, two layer film structure.

SUMMARY OF THE INVENTION

The present invention relates to a multicomponent film structure having at least three layers, the outer layers of which are hydrophobic copolyetherester elastomers and an inner layer of which is a hydrophilic copolyetherester elastomer. The film structure has excellent resistance to water absorption and is especially useful when bonded to a textile material to make articles which include, but are not limited to, raincoats, jackets, tents, wet suits, protective apparel, gloves, shoes, boots, car covers, etc.

DETAILED DESCRIPTION OF THE INVENTION

The copolyetherester layers in the film structure of the present invention are described in U.S. Pat. No. 4,725,481.

The outer layers of the film structure of the present invention are each continuous layers of a hydrophobic elastomer, $(1.3-20.3 \text{ mm}) \times 10^{-3}$ thick, preferably $(1.3-7.6 \text{ mm}) \times 10^{-3}$ thick, and having a water vapor transmission rate of 400–2500 gm.mil/m²/24 hours according to ASTM E96-90 (Procedure BW), said hydrophobic elastomer being comprised of a copolyetherester elastomer, or a mixture of two or more copolyetherester elastomers, having a multiplicity of recurring long-chain ester units and short-chain ester units joined head-to-tail through ester linkages, said long-chain ester units being represented by the formula

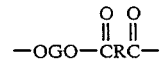     (I)

and said short-chain ester units being represented by the formula

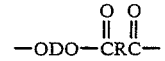     (II)

where G is a divalent radical remaining after the removal of terminal hydroxyl groups from a poly(alkylene oxide) glycol having an average molecular weight of about 400–3500, and further, the amount of ethylene oxide groups incorporated in the copolyetherester, or mixture of two or more copolyetheresters, by the poly(alkylene oxide) glycol is not greater than about 20 weight percent based upon the total weight of the copolyetherester or mixture of two or more copolyetheresters; R is a o divalent radical remaining after removal of carboxyl groups from a dicarboxylic acid having a molecular weight less than 300; and D is a divalent radical remaining after removal of hydroxyl groups from a diol having a molecular weight less than about 250; and said hydrophobic copolyetherester or mixture of two or more copolyetheresters has from about 20–80 weight percent short-chain ester units. The hydrophobic elastomer outer layers may be the same or different, bur preferably they are the same.

At least one inner layer of the film structure of the present invention is a continuous layer of a hydrophilic elastomer, $(7.6-152 \text{ mm}) \times 10^{-3}$ thick and having a water vapor transmission rate of at least 3500 gm.mil/m²/24 hours. according to ASTM E96-90 (Procedure BW), said hydrophilic elastomer being comprised of a copolyetherester elastomer, or a mixture of two or more copolyetherester elastomers, having a multiplicity of recurring long-chain ester units and short-chain ester units joined head-to-tail through ester linkages represented by formulae (I) and (II) above and having the values given above, with the proviso that the amount of ethylene oxide groups incorporated in the copolyetherester or mixture of two or more copolyetheresters by the poly(alkylene oxide) glycol is from about 25–68 weight percent based on the total weight of the copolyetherester or mixture of two or more copolyetheresters, and the hydrophilic copolyetherester or mixture of two or more copolyetheresters contain about 20–80 weight percent short-chain ester units. The hydrophilic elastomer can also be comprised of a poly(etherimide) elastomer as described in U.S. Pat. No. 4,769,273, columns 3–8, incorporated herein by reference.

By ethylene oxide groups in the copolyetherester elastomer, it is meant the weight percent in the total elastomer of ($CH_2$—$CH_2$—O—) groups in the long-chain ester units. The ethylene oxide groups in the copolyetherester elastomer that are counted to determine the amount in the polymer molecule are those derived from the poly(alkylene oxide) glycol and not ethylene oxide groups derived from or associated with the short chain ester unit.

The term long-chain ester units, as applied to units in a polymer molecule, refers to the reaction product of a long-chain glycol with a dicarboxylic acid. Such "long-chain ester units", which are repeating units in the copolyetheresters of this invention, correspond to the Formula (I) above. The long-chain glycols are polymeric glycols having terminal (or as nearly terminal as possible) hydroxy groups. The molecular weight of polymeric glycols used to make the copolyetheresters for the hydrophobic film layer or the hydrophilic film layer is from about 400–3500.

The poly(alkylene oxide) glycol used to make the hydrophobic copolyetherester elastomer can contain ethylene oxide groups such that s the total weight is less than about 20 weight percent based on the total weight of the polymer molecule. In many instances, the poly(alkylene oxide) glycol used to make the hydrophobic copolyetherester elastomer does not contain any ethylene oxide and, consequently, the resulting copolyetherester elastomer does not contain ethylene oxide residues. However, poly(alkylene oxide) glycols that contain ethylene oxide groups in amounts that result in a copolyetherester elastomer having no more than about 20 weight percent ethylene oxide groups, preferably, not greater than about 15 weight percent, based on the copolyetherester elastomer, can be used because the resulting copolyetherester elastomers have a sufficiently low degree of water vapor permeability, i.e., not greater than about 2500 gm.mil/m$^2$/24 hours. Representative poly(alkylene oxide) glycols that can be used to form the long-chain ester units of the hydrophobic copolyetherester have molecular weights from 400–3500, usually 600–2500, and include, but are not limited to, poly(1,2–and 1,3-propylene oxide) glycol, poly(tetramethylene oxide) glycol, random or block copolymers of ethylene oxide and 1,2-propylene oxide of the proper proportions and random or block copolymers of tetrahydrofuran with minor amounts of a second monomer such as methyltetrahydrofuran used in proportions such that the ethylene oxide content will result in a copolyetherester having no more than about 20 weight percent ethylene oxide groups. Preferably, the poly(alkylene oxide) glycols used to make the hydrophobic copolyetherester elastomer film are poly(tetramethylene ether) glycol or ethylene-oxide capped polypropylene oxide glycol.

The poly(alkylene oxide) glycol used to make the hydrophilic copolyetherester elastomer must contain ethylene oxide groups in amounts sufficient to result in a copolyetherester having from about 25–68 weight percent ethylene oxide groups, based on the total weight of the copolyetherester elastomer. The ethylene oxide groups cause the copolyetherester elastomer to have the characteristic of being readily s permeable to water vapor and, generally, the higher the percentage of ethylene oxide in the copolyetherester, the higher the degree of water vapor permeability. Random or block copolymers of ethylene oxide containing minor portions of a second poly(alkylene oxide) glycol can be used. Generally, if a second monomer is present, the second monomer will constitute less than about 30 mole percent of the poly(alkylene oxide) glycols, and, usually, less than about 20 mole percent. Representative long-chain glycols used to prepare the copolyetheresters that form the hydrophilic film have molecular weights of from 400–3500, usually 600–2500, and include, but are not limited to, poly(ethylene oxide) glycol, ethylene-oxide capped polypropylene oxide glycol, mixtures of poly(ethylene oxide) glycol with other glycols such as ethylene oxide capped poly(propylene oxide) glycols and/or poly(tetramethylene oxide) glycol provided the resulting copolyetherester has an amount of ethylene oxide groups of at least about 25 weight percent. Copolyetheresters prepared from poly(ethylene oxide) glycols having a molecular weight of from about 600 to 2500 are preferred because they provide a combination of superior water-vapor permeability and limited water swell and, when formed into a film, they exhibit useful properties over a wide temperature range.

The term "short-chain ester units", as applied to units in a polymer molecule of the copolyetheresters forming the hydrophobic layer or the hydrophilic layer of the multicomponent film structure, refers to low molecular weight compounds or polymer molecule units having molecular weights less than about 550. They are made by reacting a low molecular weight diol or a mixture of diols (MW below about 250) with a dicarboxylic acid to form ester units represented by Formula (II) above.

Included among the low molecular weight diols which react to form short-chain ester units suitable for use for preparing copolyetheresters forming either the hydrophobic or hydrophilic layer of the multicomponent film structure are acyclic, alicyclic and aromatic dihydroxy compounds. Preferred compounds are diols with 2–15 carbon atoms such as ethylene, propylene, isobutylene, tetramethylene, 1,4-pentamethylene, 2,2-dimethyltrimethylene, hexamethylene and decamethylene glycols, dihydroxycyclohexane, cyclohexane dimethanol, resorcinol, hydroquinone, 1,5-dihydroxynaphthalene, etc. Especially preferred diols are aliphatic diols containing 2–8 carbon atoms, most especially 1,4-butanediol. Included among the bisphenols which can be used are bis(p-hydroxy)diphenyl, bis(p-hydroxyphenyl)methane, and bis(p-hydroxyphenyl)propane. Equivalent ester-forming derivatives of diols are also useful (e.g., ethylene oxide or ethylene carbonate can be used in place of ethylene glycol). The term "low molecular weight diols" as used herein should be construed to include such equivalent ester-forming derivatives; provided, however, that the molecular weight requirement pertains to the diol and not to its derivatives.

Dicarboxylic acids which are reacted with the foregoing long-chain glycols and low molecular weight diols to produce the copolyetheresters used in this invention for both the hydrophobic and hydrophilic layers of the multicomponent film structures are aliphatic, cycloaliphatic or aromatic dicarboxylic acids of a low molecular weight, i.e., having a molecular weight of less than about 300. The term "dicarboxylic acids" as used herein, includes, but is not limited to, acid equivalents of dicarboxylic acids having two functional carboxyl groups which perform substantially like dicarboxylic acids in reaction with glycols and diols in forming copolyetherester elastomers. These equivalents include esters and ester-forming derivatives, such as acid halides and anhydrides. The molecular weight requirement pertains to the acid and not to its equivalent ester or ester-forming derivative. Thus, an ester of a dicarboxylic acid having a molecular weight greater than 300 or an acid equivalent of dicarboxylic acid having a molecular weight greater than 300 are included, provided the acid has a molecular weight below about 300. The dicarboxylic acids can contain any substituent groups or combinations which do not substantially interfere with the copolyetherester elastomer formation and use of the polymer molecule in the present invention.

Aliphatic dicarboxylic acids, as the term is used herein, refers to carboxylic acids having two carboxyl groups each attached to a saturated carbon atom. If the carbon atom to which the carboxyl group is attached is saturated and is in a ring, the acid is cycloaliphatic. Aliphatic or cycloaliphatic acids having conjugated unsaturation often cannot be used because of homopolymerization. However, some unsaturated acids, such as maleic acid, can be used.

Aromatic dicarboxylic acids, as the term is used herein, are dicarboxylic acids having two carboxyl groups attached to a carbon atom in a carbocyclic aromatic ring structure. It is not necessary that both functional carboxyl groups be attached to the same aromatic ring and where more than one ring is present, they can be joined by aliphatic or aromatic divalent radicals or divalent radicals such as —O— or —$SO_2$—.

Representative aliphatic and cycloaliphatic acids which can be used include, but are not limited to, sebacic acid, 1,3-cyclohexane dicarboxylic acid, 1,4-cyclohexane dicarboxylic acid, adipic acid, glutaric acid, 4-cyclohexane-1,2-dicarboxylic acid, 2-ethylsuberic acid, cyclopentanedicarboxylic acid, decahydro-1,5-naphthylene dicarboxylic acid, 4,4′-bicyclohexyl dicarboxylic acid, decahydro-2,6-naphthylene dicarboxylic acid, 4,4′-methylene bis(cyclohexyl) carboxylic acid, 3,4-furan dicarboxylic acid. Preferred acids are cyclohexane-dicarboxylic acids and adipic acid.

Representative aromatic dicarboxylic acids which can be used to make the copolyetheresters used herein include, but are not limited to, phthalic, terephthalic and isophthalic acids, bibenzoic acid, substituted dicarboxyl compounds with two benzene nuclei such as bis(p-carboxyphenyl)methane, p-oxy-1,5-naphthalene dicarboxylic acid, 2,6-naphthalene dicarboxylic acid, 2,7-naphthalene dicarboxylic acid, 4,4′-sulfonyl dibenzoic acid and $C_1$–$C_{12}$ alkyl and ring substitution derivatives thereof, such as halo, alkoxy, and aryl derivatives. Hydroxyl acids such as p-(beta-hydroxyethoxy)benzoic acid can also be used providing an aromatic dicarboxylic acid is also present.

Aromatic dicarboxylic acids are a preferred class for preparing the copolyetherester elastomers useful for making the multicomponent film structures of this invention. Among the aromatic acids, those with 8–16 carbon atoms are preferred, particularly terephthalic acid alone or with a mixture of phthalic and/or isophthalic acids.

Preferably, the melting point of the copolyetherester of the hydrophobic and hydrophilic elastomers is greater than 120° C., usually from about 120° C. to above about 220° C. If the melting point of the copolyetherester is less than about 120° C., then the polymer is tacky and may be difficult to handle in film form; and if the melting point is more than about 220° C., then the films can become excessively stiff. The melting points are determined by differential scanning calorimeter (DSC).

As described above, the copolyetherester elastomers forming the hydrophilic layer of the multicomponent film structure are similar to the copolyetherester elastomers forming the hydrophobic layer of the multicomponent film structure with the exception of the amount of ethylene oxide groups in the copolyetherester. In Formula (I) above, G for the hydrophilic copolyetherester or hydrophobic copolyetherester is a divalent radical remaining after the removal of terminal hydroxyl groups from a poly(alkylene oxide)glycol having a molecular weight of about 400–3500. The poly(alkylene oxide) glycol used for the hydrophilic copolyester has sufficient ethylene oxide groups such that the resulting copolyetherester has an ethylene oxide content of from about 25–68 weight percent, preferably, from about 30–55 weight percent. The poly(alkylene oxide) glycol used for the hydrophobic copolyester has an ethylene oxide content of from 0–20 weight percent.

The copolyetheresters used to make the hydrophilic layer of the multicomponent film structure of the present invention contain about 20–80 weight percent short-chain ester units, preferably about 35–60 weight percent, corresponding to Formula (II) above, the remainder being long-chain ester units corresponding to Formula (I) above. When the copolyetherester elastomers used for the hydrophilic layer of the multicomponent film structure contain less than about 20 weight percent short-chain ester units, then the crystallization rate becomes very slow and the copolyetherester is tacky and may be difficult to handle. When the copolyetherester elastomers used in the hydrophilic layer contain more than about 80 weight percent short chain-ester units, then the copolyetherester films are too stiff. The preferred balance of properties is obtained when the short-chain ester units are from about 35–60 weight percent.

The copolyetheresters used to make the hydrophobic layer of the multicomponent film structure contain about 20–80 weight percent short-chain ester units, preferably about 20–60 weight percent, corresponding to Formula (II) above, the remainder being long-chain ester units corresponding to Formula (I) above. In general, as percent short-chain ester units in the copolyetherester are increased, the polymer has a higher tensile strength and modulus, and the water vapor transmission rate decreases. Most preferably, for both the copolyetheresters forming the hydrophilic layer and the hydrophobic layers of the multicomponent film structure, at least about 70% of the groups represented by R in Formulae (I) and (II) above are 1,4-phenylene radicals and at least about 70% of the groups represented by D in Formula (II) above are 1,4-butylene radicals and the sum of the percentages of R groups which are not 1,4-phenylene radicals and D groups which are not 1,4-butylene radicals does not exceed 30%. If a second dicarboxylic acid is used to make the copolyetherester, isophthalic acid is the acid of choice and if a second low molecular weight diol is used, 1,4-butenediol or hexamethylene glycol are the diols of choice.

The hydrophobic and hydrophilic layers of the multicomponent film structure can be a blend or mixture of two or more copolyetherester elastomers. The copolyetherester elastomers used in the blend need not on an individual basis come within the values disclosed hereinabove for the elastomers. However, the blend of two or more copolyetherester elastomers that forms either the hydrophobic or hydrophilic layers must conform to the values described herein for the copolyetheresters on a weighted average basis. For example, in a mixture used to make the hydrophilic layer of the multicomponent film structure that contains equal amounts of two copolyetherester elastomers, one copolyetherester can contain 60 weight percent short-chain ester units and the other copolyetherester can contain 30 weight percent short-chain ester units for a weighted average of 45 weight percent short-chain ester units in the hydrophilic layer of the multicomponent film structure.

The water vapor transmission rate of the hydrophobic layer and hydrophilic layer constituting the multicomponent film structure can be regulated by various means. Obviously, the thickness of the layer of copolyetherester has an effect on the value of the water vapor transmission rate. The thinner the layer, the higher the value. An increase in the percent of short-chain ester units in the copolyetherester used to make a layer of the multicomponent film structure results in a decrease in the value of the water vapor transmission rate, but an increase in the value of the tensile strength of the layer due to the fact the copolyetherester elastomer is more crystalline. Usually, the water vapor transmission rate for the hydrophobic layer is from 400–2500 gm.mil/m$^2$/24 hours according to ASTM E96-90 (Procedure BW), preferably 800–1200 gm.mil/m$^2$/24 hours. The water vapor transmission rate for the hydrophilic layer is at least 3500 gm.mil/m$^2$/24 hours according to ASTM E96-90 (Procedure BW), preferably 3500–20,000 gm.mil/m$^2$/24 hours.

The Young's moduli of the copolyetherester elastomers used to make the hydrophobic layer and hydrophilic layer preferably are from 1000 to 14,000 psi, usually 2000 to 10,000 psi, as determined by ASTM Method D-412. The modulus can be controlled by the ratio of short-chain segments to long-chain segments of the copolyetherester elastomer, and comonomer choice for preparation of the copolyetherester. The importance of using copolyetheresters having a relatively low modulus is better stretch recovery and aesthetics of the composite structure when attached to textile materials for the manufacture of wearing apparel, such as jackets and raincoats, where the stiffness and drape of the garment are important for comfort.

The most preferred copolyetherester elastomers used to make the hydrophilic layer of the multicomponent film structure are those prepared from esters of terephthalic acid, e.g., dimethylterephthalate, 1,4-butanediol and poly(ethylene oxide) glycol. The most preferred copolyetherester elastomers used to make the hydrophobic layer of the multicomponent film structure are those prepared from esters or mixtures of esters of terephthalic acid and isophthalic acid, 1,4-butanediol and poly(tetramethylene ether) glycol or ethylene oxide-capped polypropylene oxide glycol.

The dicarboxylic acids or their derivatives and the polymeric glycol are incorporated into the final product in the same molar proportions as are present in the reaction mixture. The amount of low molecular weight diol actually incorporated corresponds to the difference between the moles of diacid and polymeric glycol present in the reaction mixture. When mixtures of low molecular weight diols are employed, the amounts of each diol incorporated are largely a function of the amounts of the diols present, their boiling points, and relative reactivities. The total amount of glycol incorporated is still the difference between moles of diacid and polymeric glycol.

The copolyetherester elastomers used to make the hydrophobic layer and the hydrophilic layer of the multicomponent film structure described herein can be made conveniently by a conventional ester interchange reaction. A preferred procedure involves heating the ester of an aromatic acid, e.g., dimethyl ester of terephthalic acid, with the poly(alkylene oxide) glycol and a molar excess of the low molecular weight diol, 1,4-butanediol, in the presence of a catalyst at 150°–260° C., followed by distilling off methanol formed by the interchange reaction. Heating is continued until methanol evolution is complete. Depending on temperature, catalyst and glycol excess, this polymerization is complete within a few minutes to a few hours. This product results in the preparation of a low molecular weight prepolymer which can be carried to a high molecular weight copolyetherester elastomer by the procedure described below. Such prepolymers can also be prepared by a number of alternate esterification or ester interchange processes; for example, the long-chain glycol can be reacted with a high or low molecular weight short-chain ester homopolymer or copolymer in the presence of catalyst until randomization occurs. The short-chain ester homopolymer or copolymer can be prepared by ester interchange from either the dimethyl esters and low molecular weight diols, as above, or from the free acids with the diol acetates. Alternatively, the short-chain ester copolymer can be prepared by direct esterification from appropriate acids, anhydrides or acid chlorides, for example, with diols or by other processes such as reaction of the acids with cyclic ethers or carbonates. Obviously the prepolymer might also be prepared by running these processes in the presence of the long-chain glycol.

The resulting prepolymer is carried to high molecular weight by distillation of the excess of short-chain diol. This process is known as "polycondensation". Additional ester interchange occurs during this distillation to increase the molecular weight and to randomize the arrangement of the copolyetherester units. Best results are usually obtained if this final distillation or polycondensation is run at less than 1 mm. pressure and 240°–260° C. for less than 2 hours in the presence of antioxidants such as 1,6-bis-[3,5-di-tert-butyl-4-hydroxyphenol)propionamido]-hexane or 1,3,5-trimethyl-2,4,6-tris[3,5-ditertiary-butyl-4-hydroxybenzyl]benzene.

Most practical polymerization techniques rely upon ester interchange to complete the polymerization reaction. In order to avoid excessive hold time at high temperatures with possible irreversible thermal degradation, it is advantageous to employ a catalyst for ester interchange reactions. While a wide variety of catalysts can be used, organic titanates such as tetrabutyl titanate used alone or in combination with magnesium or calcium acetates are preferred. Complex titanates, such as derived from alkali or alkaline earth metal alkoxides and titanate esters are also very effective. Inorganic titanates, such as lanthanum titanate, calcium acetate/antimony trioxide mixtures and lithium and magnesium alkoxides are representative of other catalysts which can be used.

Ester interchange polymerizations are generally run in the melt without added solvent, but inert solvents can be used to facilitate removal of volatile components from the mass at low temperatures. This technique is especially valuable during prepolymer preparation, for example, by direct esterification. However, certain low molecular weight diols, for example, butanediol, are conveniently removed during polymerization by azeotropic distillation. Other special polymerization techniques, for example, interfacial polymerization of bisphenol with bisacylhalides and bisacylhalide capped linear diols, may prove useful for preparation of specific polymers. Both batch and continuous methods can be used for any stage of copolyetherester polymer preparation. Polycondensation of prepolymer can also be accomplished in the solid phase by heating finely divided solid prepolymer in a vacuum or in a stream of inert gas to remove liberated low molecular weight diol. This method has the advantage of reducing degradation because it must be used at temperatures below the softening point of the prepolymer. The major disadvantage is the long time required to reach a given degree of polymerization.

Although the copolyetheresters possess many desirable properties, it is sometimes advisable to stabilize these compositions further against heat or light produced degradation. Stabilization can be done very readily by incorporating conventional stabilizers in the copolyetherester compositions. Satisfactory stabilizers comprise phenols, especially hindered phenols and their derivatives, amines and their derivatives, especially arylamines, such as 4,4'-2,2-dimethylbenzyl)diphenylamine.

Representative phenol derivatives useful as stabilizers include 4,4'-bis(2,6-di-tertiary-butylphenol); 1,3,5-trimethyl-2,4,6-tris[3,5-di-tertiary-butyl-4-hydroxybenzyl]benzene and 1,6-bis[3,5-di-tert-butyl-4-hydroxyphenyl)propionamido]-hexane. Mixtures of hindered phenols with costabilizers such as diaurylthiodipropionate or phosphites are particularly useful. Improvement in light stability occurs by the addition of small amounts of pigments or the incorporation of a light stabilizer, such as benzotriazole ultraviolet light absorbers. The addition of hindered amine photostabilizers, such as bis(1,2,2,6,6-pentamethyl-4-piperidinyl)n-butyl-(3,5-di-tert-butyl-4-hydroxybenzyl)malonate, usually in amounts of from 0.05–1.0% by weight of the copolyetherester, are particularly useful in preparing compositions having resistance to photodegradation.

Various conventional fillers can be added to the copolyetheresters usually in amounts of from about 1–percent by weight of the copolyetherester or mixture of copolyetheresters that form layers of the multicomponent film. Fillers such as clay, talc, alumina, carbon black, silica can be used, the latter being preferred, and white and light colored pigments can be added to the polymers. In general, these additives have the effect of increasing the modulus at various elongations. It is advantageous to add the inorganic filler in finely divided form to the hydrophilic copolyetherester used to make apparel and the like in order to improve the slip and blocking characteristics of the hydrophilic layer and to give improved sewability and aesthetics without sacrificing the integrity of adhesion of the layer to the textile material.

Any suitable textile material used for the manufacture of rainwear, jackets, protective clothing, tents and the like can be attached, preferably by melt bonding or adhesive bonding, to the multicomponent film structure. Usually, the textile materials used are polyethylene terephthalate, or polyamides such as nylon 6, or nylon 66, cotton, cellulose triacetate, etc. The textile materials are attached to or bonded to the multicomponent film structure using conventional techniques. Usually conventional materials, such as fluorocarbons and silicones, are coated or sprayed on the textile material to render it more water-repellent.

The multicomponent film structure can be made by standard coextrusion processes. For example, the copolyetherester and additives, if any, forming the hydrophilic layer of the multicomponent film structure is fed to one extruder and the copolyetherester and additives, if any, forming the hydrophobic layers is fed into a second extruder or optionally a third extruder. The polymers in the extruders are heated above their melting points and each layer is passed to a conventional melt combining block connected to the extruders, where the extruded layers are contacted one on top of the other. The layers then pass through a flat die connected to the combining block where the coextruded layers adhere to each other and form a multicomponent film structure. The multicomponent film structure coming out of the die may be melt coated on a support substrate, such as lightweight polyester film, release paper, etc., and the multicomponent film structure is wound and stored for use.

If it is desired to make a multicomponent film structure into material for fabrication into a raincoat, jacket or other garment, or tent, etc., the multicomponent film structure is bonded to a textile material, such as poly(ethylene terephthalate), by thermal lamination of the multicomponent film structure on hot roll calendering equipment or alternatively by conventional adhesive lamination or by sonic bonding. The resulting flexible layered product can be made into wearing apparel, tents, etc.

The examples that follow are illustrative of the invention.

EXAMPLES

The materials used in the examples below were as follows:

Copolyetherester A forming a hydrophobic layer of film contained 23 calculated weight percent 1,4-butylene terephthalate and 77 calculated weight percent polytetramethylene ether glycol, which has a molecular weight of 2050. The copolyetherester has a calculated ethylene oxide content of 0 weight percent. The copolyetherester has a melting point of 170° C. and a water vapor transmission rate (WVTR) of 1,100 gm.mil/m$^2$/24 hours.

Copolyetherester B forming a hydrophilic layer of film contained 45 calculated weight percent 1,4-butylene terephthalate and 55 calculated weight percent poly(propylene ether)glycol copolymer with ethylene oxide, which has a molecular weight of 2150. The copolyetherester has a calculated ethylene oxide content of 33 weight percent. The copolyetherester has a melting point of 200° C. and a water vapor transmission rate (WVTR) of 11,000 gm.mil/m$^2$/24 hours.

Copolyester C forming a hydrophilic layer of film contained 35 calculated weight percent 1,4-butylene terephthalate, 10 caculated weight percent 1,4-butylene-isophthalate, 43 calculated weight pecent poly(propylene ether glycol copolymer with ethylene oxide terephthalate, and 12 calculated weight percent poly(propylene ether glycol copolymer with ethylene oxide isophthalate. The poly(alkylene oxide) glycol used to make the copolyetherester had a molecular weight of 2150. The copolyetherester had a calculated ethylene oxide content of 37 weight percent. The copolyetherester had a melting point of 150° C. and a water vapor transmission rate (WVTR) of 14,000 gm.mil/m$^2$/24 hours.

Water vapor transmission rate (WVTR) was determined by ASTM E96–90 (Procedure BW), run at 22° C.

The film structures used in the examples are prepared by feeding each copolyetherester described in the TABLE below into extruders connected to a common melt combining block and by following conventional co-extrusion processes. The coextruder layers are combined in the melt block. The layers are then passed through a die connected to the combining block. A bonded film structure is formed exiting from the die. The thickness of the individual film layers, along with the WVTR of the film structure and the water absorption experienced by the film structure, is provided below in the TABLE.

Water absorption was determined from the co-extruded film structures. Film samples were cut to 7.5 cm × 12.5 cm specimens and dried in a vacuum oven at 50° C. for 24 hours. Three specimens of each sample were weighed (dry) and then immersed in de-ionized water for 2 hours. The specimens were blotted and then re-weighed. Water absorption was reported as the average percent weight increase for the three specimens.

The results in the TABLE below show that the multicomponent, multi-layer film structure of the present invention experienced less water absorption and had lower water vapor transmission rates than did comparable bi-component, 2 layer film structures.

TABLE

| Example No. | Film Structure | Film Thickness (mm) | WVTR (gm · mil/m²/ 24 hours) | Water Absorption (%) |
|---|---|---|---|---|
| 1 | C/A | .0225/.0025 | 6,900 | 57 |
| 2 | A/C/A | .0025/.02/.0025 | 4,000 | 30 |
| 3 | B/A | .0225/.0025 | 6,000 | 43 |
| 4 | A/B/A | .0025/.02/.0025 | 3,700 | 10 |

I claim:

1. A multicomponent film structure comprising at least three layers bonded together, (A) wherein the outer layers of the structure are each a continuous layer of a hydrophobic elastomer, $(1.3-20.3\text{mm}) \times 10^{-3}$ thick and having a water vapor transmission rate of 400–2500 gm.mil/m²/24 hours according to ASTM E96-90 (Procedure BW), said hydrophobic elastomer being comprised of at least one copolyetherester elastomer having a multiplicity of recurring long-chain ester units and short-chain ester units joined head-to-tail through ester linkages, said long-chain ester units being represented by the formula

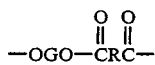
(I)

and said short-chain ester units being represented by the formula

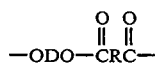
(II)

where G is a divalent radical remaining after the removal of terminal hydroxyl groups from a poly(alkylene oxide) glycol having an average molecular weight of about 400–3500, and further, the amount of ethylene oxide groups incorporated in the copolyetherester or mixture of two or more copolyetheresters by the poly(alkylene oxide) glycol is not greater than about 20 weight percent based upon the total weight of the copolyetherester or mixture of two or more copolyetheresters; R is a divalent radical remaining after removal of carboxyl groups from a dicarboxylic acid having a molecular weight less than 300, D is a divalent radical remaining after removal of hydroxyl groups from a diol having a molecular weight less then about 250; and said hydrophobic copolyetherester or mixture of two or more copolyetheresters has from about 20–80 weight percent short-chain ester units, and (B) wherein at least one inner layer is a continuous layer of a hydrophilic elastomer, $(7.6-152\text{mm}) \times 10^{-3}$ thick and having a water vapor transmission rate of at least 3500 gm.mil/m²/24 hours according to ASTM E96-90 (Procedure BW), said hydrophilic elastomer being comprised of at least one copolyetherester elastomer having a multiplicity of long-chain ester units and short-chain ester units joined head-to-tail through ester linkages represented by formulae (I) and (II) above and having the values given above, with the proviso that the amount of ethylene oxide groups incorporated in the copolyetherester or mixture of two or more copolyetheresters by the poly(alkylene oxide) glycol is from about 25–68 weight percent based on the total weight of the copolyetherester or mixture of two or more copolyetheresters, and the hydrophilic copolyetherester, or mixture of two or more copolyetheresters, contain about 20–80 weight percent short-chain ester units.

2. The multicomponent film structure of claim 1 wherein the hydrophilic elastomer layer comprises a mixture of copolyetherester elastomers.

3. The multicomponent film structure of claim 1 wherein the hydrophilic elastomer layer comprises a poly(etherimide) ester elastomer.

4. The multicomponent film structure of claim 1 wherein the hydrophobic elastomer layer comprises a mixture of copolyetherester elastomers.

5. The multicomponent film structure of claim 1 wherein the layers additionally contain an inorganic filler.

6. The multicomponent film structure of claim 1 that is bonded to a textile material.

* * * * *